(12) United States Patent
Norgaard et al.

(10) Patent No.: US 10,117,030 B2
(45) Date of Patent: *Oct. 30, 2018

(54) METHOD AND SYSTEM FOR WIRELESS COMMUNICATION BETWEEN A TELEPHONE AND A HEARING AID

(71) Applicant: Widex A/S, Lynge (DK)

(72) Inventors: Peter Magnus Norgaard, Vanlose (DK); Jan Hellinghus, Farum (DK); Morten Kroman, Taastrup (DK)

(73) Assignee: Widex A/S, Lynge (DK)

( * ) Notice: Subject to any disclaimer, the term of this patent is extended or adjusted under 35 U.S.C. 154(b) by 0 days.

This patent is subject to a terminal disclaimer.

(21) Appl. No.: 15/841,741

(22) Filed: Dec. 14, 2017

(65) Prior Publication Data
US 2018/0109888 A1    Apr. 19, 2018

Related U.S. Application Data

(63) Continuation of application No. 13/835,588, filed on Mar. 15, 2013, now Pat. No. 9,877,120, which is a
(Continued)

(51) Int. Cl.
*H04R 25/00* (2006.01)
*H04M 1/725* (2006.01)
(Continued)

(52) U.S. Cl.
CPC ...... *H04R 25/554* (2013.01); *H04M 1/72575* (2013.01); *H04R 25/70* (2013.01);
(Continued)

(58) Field of Classification Search
CPC combination set(s) only.
See application file for complete search history.

(56) References Cited

U.S. PATENT DOCUMENTS 6,801,611 B2    10/2004  Guccione
7,242,778 B2 *   7/2007  Csermak .............. H04R 25/305
                                                    381/315
(Continued)

FOREIGN PATENT DOCUMENTS

DE    10200606176 A1    7/2008
JP    2002-369294 A    12/2002
(Continued)

OTHER PUBLICATIONS

International Search Report with Written Opinion of the International Searching Authority for PCT/EP2010/070450 dated Jul. 19, 2011.
(Continued)

*Primary Examiner* — Amir Etesam
(74) *Attorney, Agent, or Firm* — Sughrue Mion, PLLC

(57) ABSTRACT

The present invention relates to a system comprising a telephone (10) and a hearing aid (40). The analog signal to the loudspeaker (11) of the telephone (10) is picked up and digitalized at the telephone where after it is wirelessly transmitted to the hearing aid (40) using a radio transceiver at the telephone (10), coupling with a radio at the hearing aid. The sound from the telephone (10) is hereby transmitted directly to the hearing aid without relying on the acoustic coupling between the telephone speaker (11) and the hearing aid microphones and may further be transmitted to both left and right hearing aid at the same time. The invention provides a telephone, a hearing aid and a method of communicating with a hearing aid.

19 Claims, 4 Drawing Sheets

Related U.S. Application Data continuation-in-part of application No. PCT/EP2010/070410, filed on Dec. 22, 2010.

(51) Int. Cl.
*H04M 1/60* (2006.01)
*H04M 1/24* (2006.01)

(52) U.S. Cl.
CPC ............... *H04M 1/24* (2013.01); *H04M 1/60* (2013.01); *H04R 25/552* (2013.01)

(56) References Cited

U.S. PATENT DOCUMENTS

| | | | |
|---|---|---|---|
| 7,657,049 B2 | 2/2010 | Waldron et al. | |
| 7,965,851 B2 | 6/2011 | Bengtsson | |
| 8,254,606 B2 | 8/2012 | Zhang et al. | |
| 8,280,086 B2 * | 10/2012 | Topholm | H04R 25/558 381/312 |
| 2002/0015506 A1 | 2/2002 | Aceti et al. | |
| 2005/0078844 A1 | 4/2005 | Von Ilberg | |
| 2005/0283263 A1 | 12/2005 | Eaton et al. | |
| 2006/0062412 A1 | 3/2006 | Berg | |
| 2007/0140187 A1 | 6/2007 | Rokusek | |
| 2007/0141979 A1 | 6/2007 | Brey | |
| 2010/0128908 A1 | 5/2010 | Park | |
| 2010/0142738 A1 | 6/2010 | Zhang et al. | |
| 2010/0158292 A1 | 6/2010 | Pedersen | |
| 2011/0176686 A1 | 7/2011 | Zaccaria | |

FOREIGN PATENT DOCUMENTS

| | | |
|---|---|---|
| JP | 2007-97060 A | 4/2007 |
| JP | 2008-527867 A | 7/2008 |
| WO | 2006/074655 A1 | 7/2006 |
| WO | 2006/097099 A1 | 9/2006 |
| WO | 2011/044898 A1 | 4/2011 |

OTHER PUBLICATIONS

Communication dated Jun. 11, 2014, issued by the Japanese Patent Office in counterpart Japanese Patent Application No. 2013-545060.

* cited by examiner

METHOD AND SYSTEM FOR WIRELESS COMMUNICATION BETWEEN A TELEPHONE AND A HEARING AID

CROSS-REFERENCE TO RELATED APPLICATIONS

The present application is a continuation of U.S. application Ser. No. 13/835,588 filed on Mar. 15, 2013, which is a continuation-in-part of international application PCT/EP201/0070450, filed on 22 Dec. 2010, in Europe, and published as WO2012/084026 A1. The entire disclosures of the prior applications are considered part of the disclosure of the accompanying continuation, and are hereby incorporated by reference.

BACKGROUND OF THE INVENTION

1. Field of the Invention

The present invention relates to hearing aids. The invention further relates to a telephone adapted for communicating with a hearing aid. The invention also relates to a method of communicating with a hearing aid.

The invention more specifically relates to a telephone and to a programmable hearing aid to be located at or in the ear of a user. The invention more particularly relates to using such a hearing aid in co-operation with a telephone by creating a wireless link from the telephone to the hearing aid.

2. The Prior Art

WO-A1-2006/097099 describes a cell phone with a plug-in device for communicating with a hearing aid, whereby the cell phone with plug-in device can be used as a remote control for a hearing aid.

U.S. Pat. No. 7,657,049 describes a telephone handset with a hearing aid compatible coil for inductively coupling with the telecoil at the hearing aid in order to inductively transmit sound from the telephone speaker to the telecoil of the hearing aid.

US-A1-20100128908 describes a telephone including a hearing aid chip for amplifying the acoustic output sound from the telephone according to the hearing threshold of the user.

Application PCT/DK2009/050274 filed on 15 Oct. 2009 in Denmark, and published as WO-A1-2011044898 describes a codec for coding and decoding of wirelessly transmitted data to and from a hearing aid to reduce the bit stream and hereby the power consumption of the hearing aid while maintaining a strong wireless signal for transferring data and sound to and from a hearing aid.

US-A1 2010/0142738 discloses a hearing aid where some settings can be controlled via acoustic signals. For instance if the hearing aid user whishes to increase the volume, he may do so by typing a prescribed key string on the telephone. This will give rise to a corresponding acoustic output from the telephone, which may be interpreted by the hearing aid as e.g. a volume control signal.

In the context of the present disclosure, a hearing aid is defined as a small, battery-powered device, comprising a microphone, an audio processor and an acoustic output transducer, configured to be worn in or behind the ear by a hearing-impaired person. By fitting the hearing aid according to a prescription calculated from a measurement of a hearing loss of the user, the hearing aid may amplify sound in certain frequency bands in order to compensate the hearing loss in those frequency bands. In order to provide an accurate and flexible amplification, most modern hearing aids are of the digital variety which can be programmed to fit the users prescription.

For many users of hearing aids today, the use of telephones in connection with their hearing aid is difficult, as relying on the acoustic path from the telephone speaker to the eardrum via the hearing aid does not provide the optimum rendering of the sound. This is especially a problem when using a "behind the ear" (BTE) hearing aid, as the microphones of such hearing aids are located above the ear, thereby removed from the telephone loudspeaker when the telephone is held in the normal position. Even a user skilled in positioning the telephone loudspeaker in a position closer to the microphone of the hearing aid, will experience a signal reduction of about 10-20 dB. At the contralateral ear, i.e. the ear opposite the one where the telephone is placed, there will be no signal at all.

Several manufacturers of hearing aids and telephone systems have tried to overcome this problem, in different ways. One common way to try to overcome this problem has been to rely on the coil of the telephone speaker to excite the telecoil of the hearing aid, whereby the sound from the telephone is transferred to the hearing aid inductively. However with many modern telephones, the speaker coil is too small to create a magnetic field with sufficient signal strength.

Another solution has been to Bluetooth-enable the hearing aid and then pair up the hearing aid with the telephone. A Bluetooth signal from the telephone can then be picked up by the hearing aid and decoded to form an amplified acoustic sound to the user of the hearing aid. This solution has several disadvantages. Bluetooth is very power consuming, the hearing aid and the telephone have to be paired, and because the Bluetooth link is very power consuming, the link has to be disabled after every call and then enabled and paired again before a new call, which is all very time consuming for answering a call. A further disadvantage when using Bluetooth technology is the delay time. When dealing with real time audio signals, the delay time should preferably be less than 10 ms. If the delay is more than approximately 10 ms the delay will be noticeable for the user, as the same sound arrives at the ear drum at a first time instance due to direct sound transmission and at a second time instance due to the sound being delayed by signal processing and transmission time. In Bluetooth devices the delay time is more than 10 ms.

Yet another solution has been to adjust the sound from the telephone to compensate the hearing impaired persons hearing loss. This has the disadvantage that the hearing impaired person would have to take off the hearing aids before making a phone call, and that the telephone would only be usable for the hearing impaired, as the sound would be much to loud for normal hearing people. Furthermore the telephone would have to be fitted by a hearing care professional to the exact hearing loss the impaired is suffering, something which would be very time consuming and costly.

SUMMARY OF THE INVENTION

The present invention in a first aspect provides a telephone adapted for communicating with a hearing aid, said telephone comprising a telephone loudspeaker, an electrical signal line for exciting the loudspeaker, a radio transceiver adapted for communicating with a hearing aid radio unit, and an interface circuit, said interface circuit having an analogue to digital converter, said interface circuit being connected to obtain an electrical signal from said electrical signal line and being adapted for converting said electrical signal into a digital signal by the analog to digital converter and for transmitting said digital signal to the hearing aid, using said radio transceiver.

According to an aspect of the invention, an electronic circuit having a radio transceiver using a hearing aid compatible radio protocol is built into the telephone and connected to the telephone microphone and speaker and to the telephone power supply. The interface circuit receives the signal leading to the telephone speaker, converts the signal into a digital signal, encodes the digital signal, and transmits it through a wireless link to the hearing aid. The interface circuit interfaces with all kinds of telephones with a minimum of modifications required in the telephone, and it does not impair or modify normal function of the telephone.

In an embodiment of the invention, the system can be used for programming or changing the setting of the hearing aid via Dual Tone Multiple Frequency (DTMF) tones. In this embodiment, the system is able to acknowledge the programming by automatically sending a message from the hearing aid via the telephone to the programmer at the other end of the telephone line.

Furthermore, the system can be a full duplex system, where the hearing aid is able to transmit messages to the telephone via the wireless link, e.g. the hearing aid may acknowledge the re-setting or adjustment using the wireless link, so that an acoustic acknowledge signal is sent over the telephone line to a hearing aid professional.

The invention in a second aspect provides a hearing aid comprising a hearing aid comprising a radio circuit adapted for communication with a telephone, said telephone having a telephone loudspeaker, an electrical signal line for exciting the loudspeaker, a radio transceiver adapted for communicating with said hearing aid radio circuit, and an interface circuit, said interface circuit being connected to obtain an electrical signal from said electrical signal line and being adapted for converting said electrical signal into a digital signal by an analog to digital converter and for transmitting said digital signal to the hearing aid using said radio transceiver, wherein parameters of the hearing aid can be adjusted by tones sent over a telephone network to said telephone and from there to the hearing aid radio circuit.

The invention in a third aspect provides a method for adjusting parameters of a hearing aid comprising: selecting a first telephone, said first telephone having a telephone loudspeaker, an electrical signal line for exciting the loudspeaker, a radio transceiver, and an interface circuit; obtaining by said interface circuit an electrical signal from said electrical signal line; converting said electrical signal into a digital signal by an analog to digital converter; transmitting said digital signal to the hearing aid using said radio transceiver; sending a tone sequence from said first telephone to the hearing aid; determining by said hearing aid whether the tones contain an adjustment code for adjusting said parameters of the hearing aid; and, in the affirmative, adjusting the parameters of the hearing aid.

The invention in a fourth aspect provides a method for communicating between a telephone and a hearing aid, the telephone having a telephone loudspeaker, and an electrical signal line for exciting the loudspeaker, comprising the steps of: providing in the telephone a radio transceiver and an interface circuit; connecting the interface circuit to the electrical signal line for obtaining an electrical signal from the electrical signal line; converting the electrical signal into a digital signal; and transmitting by the radio transceiver the digital signal to the hearing aid.

BRIEF DESCRIPTION OF THE DRAWINGS

By way of example, there is shown and described a preferred embodiment of this invention. As will be realized, the invention has several additional embodiments, and its several details are capable of modification in various, obvious aspects all without departing from the invention. Accordingly, the drawings and descriptions will be regarded as illustrative in nature and not as restrictive.

In the drawings.

DETAILED DESCRIPTION

In the present context, the word telephone can mean any type of telephone, i.e. a handset for a traditional landline telephone, a cordless telephone like a Digital Enhanced Cordless Telecommunications (DECT) phone, a cell phone or any other type of telephone. The signal line leading to the speaker may be any kind of transmission line, e.g. a line for transmitting an analogue signal, a sigma-delta signal, or a pure digital signal.

Figure 1:
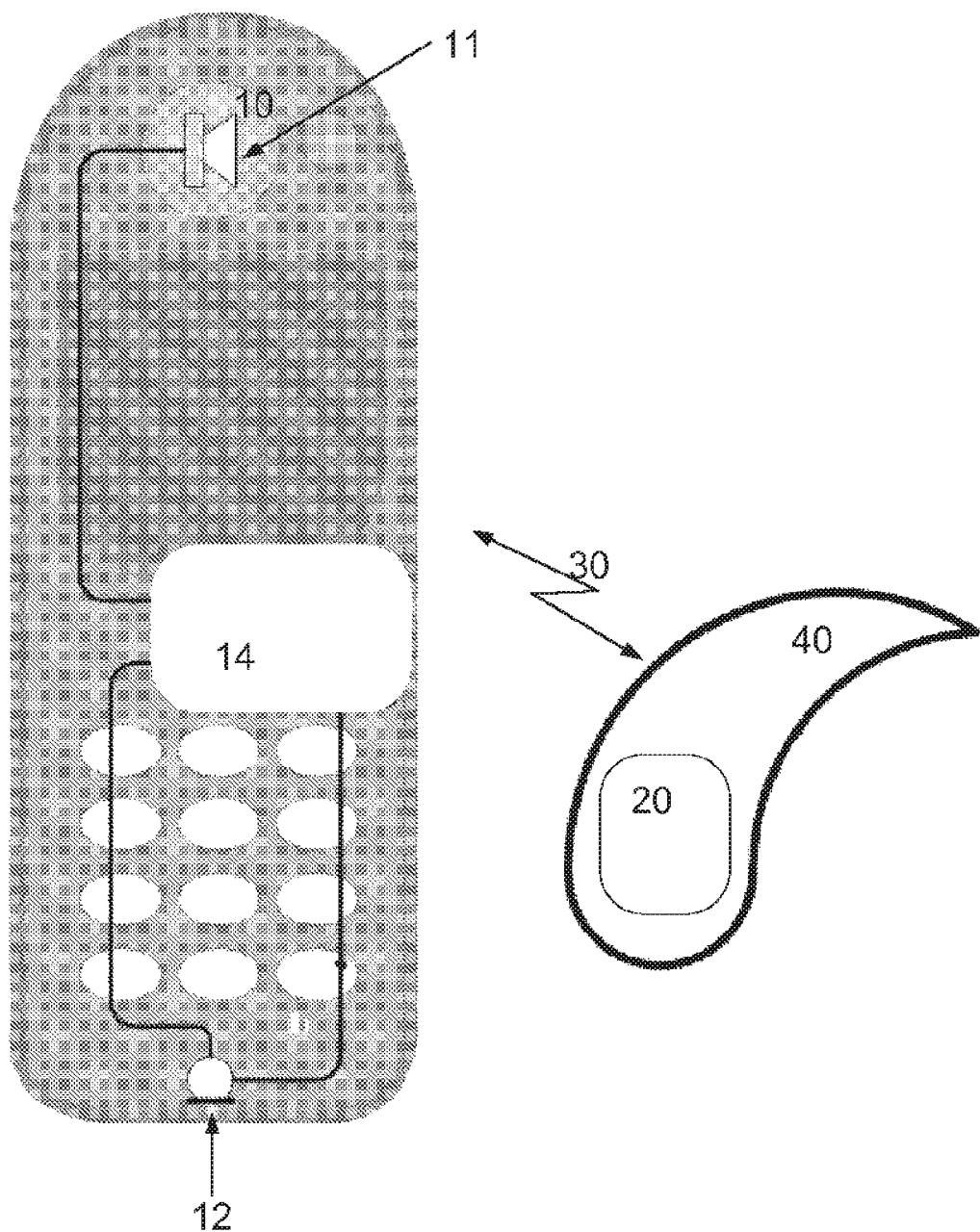
FIG. 1 illustrates a telephone having means for sending a wireless signal to the hearing aid.

FIG. 1 is a diagram of the interface circuit 14 incorporated in a telephone 10, which further has a microphone 12 and a loudspeaker 11. The interface circuit 14 is connected to the microphone 12, the loudspeaker 11 and a telephone power supply (not shown). The interface circuit 14 has a radio transceiver and antenna circuitry for establishing a wireless link 30 between the telephone 10 and one or more hearing aids 40. A hearing aid 40 has a signal processor 20 with a wireless capability.

Figure 2:
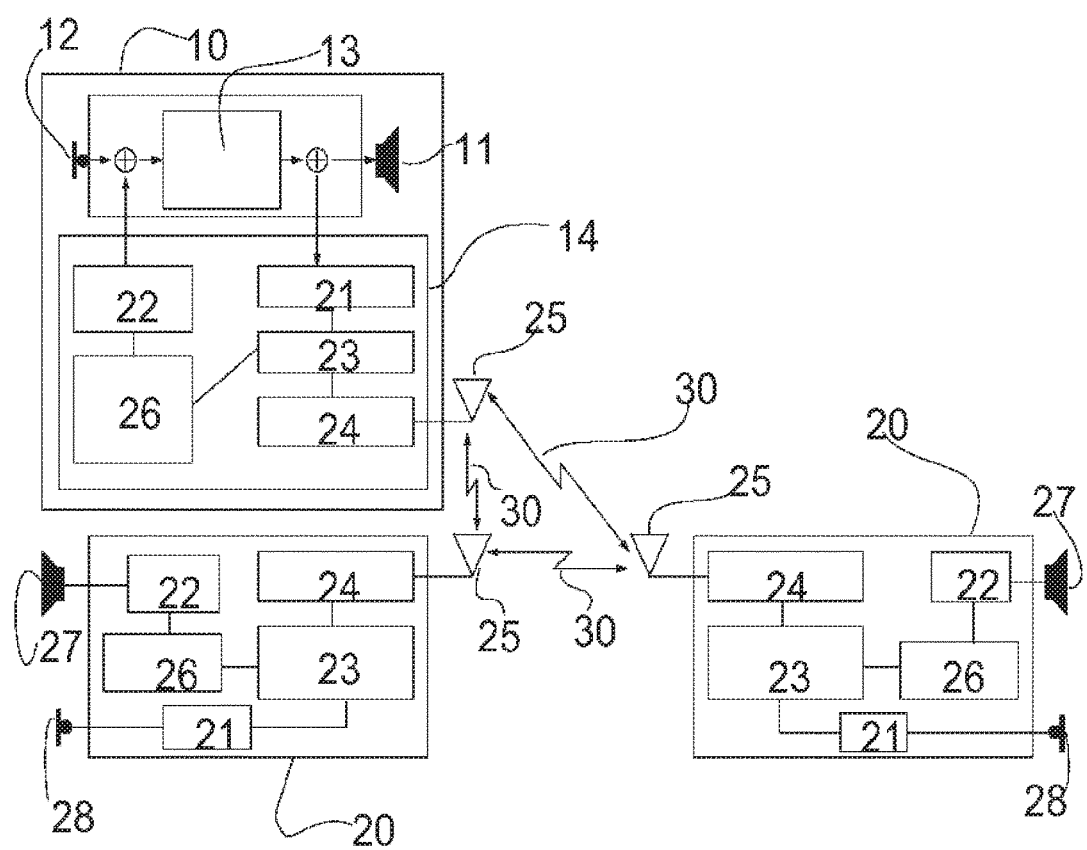
FIG. 2 is a diagram containing the different components of a system according to an embodiment of the invention, containing two hearing aids and one telephone.

FIG. 2 shows the components in a system according to an embodiment of the invention with binaural hearing aids. The system comprises two identical hearing aids 20, left and right, and a telephone 10 having a speaker 11, a microphone 12, an electronic phone circuit 13 for handling phone processing, and interface circuit 14. Said interface circuit 14 is connected to the microphone, speaker and power supply of the telephone. The interface circuit 14 comprises a digital to analog (D/A) converter 22, an analogue-to-digital (A/D) converter 21, an EEPROM 26, a signal processor 23, a radio transceiver 24 and an antenna 25 for communicating with the hearing aids 20. Each of the two hearing aids 20 comprises a microphone 28 for picking up acoustic sound from the surroundings, an analog to digital converter 21 for digitizing said acoustic sound, a signal processing unit 23, a radio circuit 24, an EEPROM 26, a D/A converter 22, and a receiver (hearing aid loudspeaker) 27.

Figure 3:
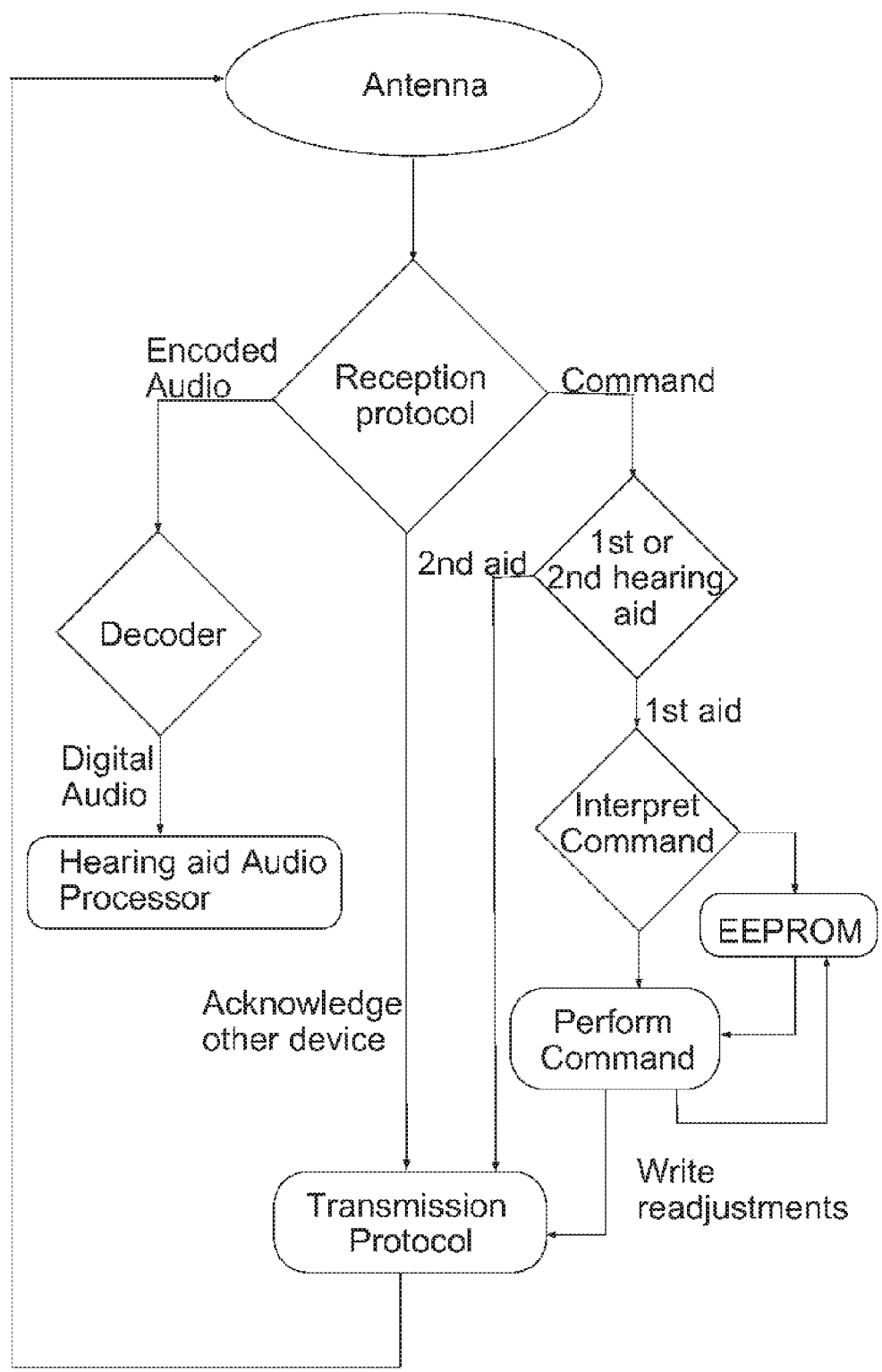
FIG. 3 is a flowchart for a hearing aid receiving data from a telephone.

FIG. 3 is a flow chart of the decision flow in a hearing aid receiving data from a telephone. Data received by the antenna is interpreted according to a reception protocol. The reception protocol interprets whether the received data is encoded audio, commands, or an acknowledge signal from another device on a previous sent command. If the received data is encoded audio, the data is decoded and processed like audio received by the hearing aid microphones. If the received data contains an acknowledge signal from another device, i.e. the contralateral hearing aid, the acknowledge signal may be stored in a log (not shown) and processed according to the transmission protocol and then relayed on to the device having sent the original command.

If the received data contains a command, it should first be interpreted whether the command is intended for the first or second hearing aid, as the user may not hold the telephone near the hearing aid for which the command is intended. In the case where the ipselateral hearing aid (i.e. the hearing aid at the side of the telephone) is used as a relay device between the telephone and the contralateral hearing aid (i.e. the hearing aid at the side opposite the side of the telephone) and a command is intended for the second hearing aid, the transmission protocol will ensure that it is relayed over to the contralateral hearing aid. In the case where the command is intended for the ipselateral hearing aid, the command is first interpreted. Once interpreted, the command may either be performed directly or by first getting information from the EEPROM and then performing the command. Performing the command may further comprise writing data to the EEPROM. Once the command has been performed, it is often desirable to send a message to the other device that the command has been performed successfully, or that the command has not been performed. This message is stored in the EEPROM, and transmitted to the other device according to the transmission protocol.

Figure 4:
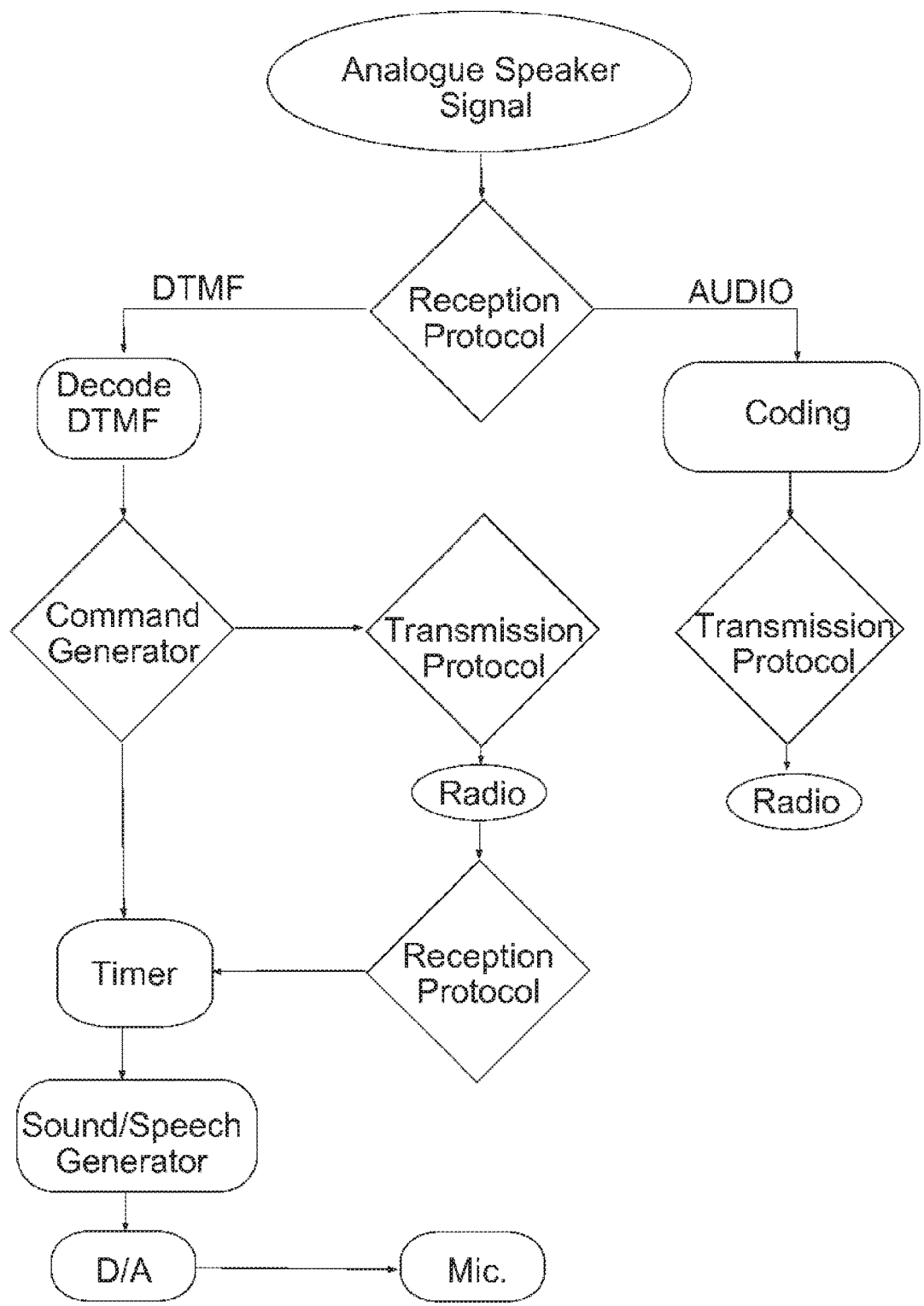
FIG. 4 is a flowchart for the interface circuit within the telephone, when communicating with the hearing aid.

FIG. 4 is a flow chart of the decision logic of the telephone interface circuit, in the case where the telephone handles the reprogramming or adjustment of the hearing aid. The interface circuit and hereby the radio transceiver is enabled by the biasing signal to the telephone microphone signal (not shown). The electronic interface circuit is enabled for picking up the electrical signal adapted to excite the loudspeaker. The reception protocol determines whether the audio signal is ordinary audio, or a data command, like DTMF. The audio signal is coded and sent to the hearing aid via the wireless link using the specific transmission protocol and the radio transceiver. When the reception protocol interprets the audio signal to be a sequence of tones like DTMF, the tone sequence is decoded and interpreted using a look-up table at the command generator. The corresponding parameter adjustment signal is sent to the hearing aid via the transmission protocol and the radio link.

The command generator also triggers a timer. If the parameter adjustment is implemented successfully, the radio receives an acknowledge signal, which will be interpreted according to the reception protocol triggering the reset of the timer. This will then trigger a speech or sound generator, generating a digital speech signal which is converted into an analogue signal in the D/A converter and finally super imposed onto to the microphone signal. By adding the generated sound to the microphone signal, the sound acknowledging the parameter adjustment in the hearing aid will be communicated over the telephone network to inform the hearing aid professional initiating the reprogramming, that the reprogramming has been successful. In case that the reprogramming was not successful, no acknowledge message is received at the radio transceiver and the timer is consequently not reset. This will then trigger another message by the speech/sound generator, that the reprogramming was not successful. This signal is sent to the hearing care professional like explained previously.

The present invention can be used with any kind of telephone. An interface circuit is built into the telephone. A suitable interface circuit typically has the size of a few square millimeters and less than one millimeter in thickness, and thus any kind of telephone can be modified to accommodate this additional interface circuit. The interface circuit is connected to the telephone power supply, microphone, and speaker. The interface circuit may be powered by the bias voltage to the microphone, hereby decreasing the complexity in wiring the interface circuit in the telephone.

When a user of this system answers, or makes a call, he lifts the handset of his landline telephone or presses a button on the cell phone or DECT (Digital Enhanced Cordless Telecommunication) telephone for making the call, whereby the microphone is biased. The microphone biasing will enable the radio line in the electronic interface circuit 14. The interface circuit 14 in the telephone picks up the analog signal from the telephone speaker, converts it into a digital signal in the A/D converter 21, prepares the digital signal for being transmitted over the wireless link in the processor 23 and transmits it to the hearing aid via the radio transceiver 24 and the antenna 25. The hearing aid 20 then receives the source sound as played by the telephone speaker via the wireless link from the telephone 10, the antenna 25 and the radio transceiver 24 instead of, or in addition to, the acoustic sound received. The digital signal is then processed according to the hearing prescription of the user in the hearing aid signal processor 23, converted into analog in the D/A converter 22 and rendered as an acoustic sound using the hearing aid receiver. The user hereby gets the telephone signal by the acoustic sound directly from the telephone, practically simultaneously with the signal through the hearing aid, without relying on a poor acoustic coupling between the telephone speaker and the hearing aid microphone or other less preferred systems having poor signal to noise ratio.

In an embodiment the wirelessly transmitted signal is received by both hearing aids, while the telephone is near one ear, as the range of transmission, under normal circumstances, can extend across the width of a users head. The user hereby gets a binaural signal and hereby a better total signal to noise ratio. In another embodiment, the ipselateral hearing aid receiving the signal from the telephone relays the data to the contralateral hearing aid.

Furthermore, in order to increase the signal to noise ratio for the user receiving or making a phone call, the hearing aids may disable the hearing aid microphones 28, or decrease the gain applied to the microphone signals, as long as the hearing aids are receiving wirelessly transmitted digital audio from the telephone.

In a further embodiment, the interface can be used for adjusting or reprogramming the hearing aid, preferably by using DTMF tones. If the user is dissatisfied with the settings of the hearing aid, the user may call the dispenser of the hearing aid to explain the dispenser in which situations certain sounds are perceived as too loud, too soft etc. If the dispenser recognizes the solution to the problem as described over the telephone by the user, the dispenser will first recall the settings of the particular hearing aid from a database, via the fitting software. Using the fitting software, the dispenser will then adjust the settings of the hearing aid via DTMF tones sent over the telephone line to the hearing aid. As the tones will be transmitted directly to the hearing aid using the digital wireless link, there is no acoustic loss in the transmission.

The dispenser may be able to transmit the DTMF code for solving the particular problem, directly from his computer if the computer is coupled to the telephone line, e.g. if the dispenser is using IP telephony. Otherwise the fitting software may display a key sequence, which the dispenser could type on a telephone keypad, in order to send the correct DTMF sequence to the hearing aid. Still further, the DTMF sequence may be played by the fitting software, in order that the dispenser may hold the telephone near the speaker coupled to the computer running the fitting software, to have the tones sent over the telephone network and recognized by the hearing aid.

According to an aspect of the invention, the adjustment of a hearing aid may be executed either by the telephone or by the hearing aid itself. In an embodiment it is executed by the contralateral hearing aid, upon receipt of the DTMF signal. Whether the telephone handles the adjustment or the hearing aid handles it, it is a similar process. The interface circuit within the telephone receives an analog signal according to the DTMF signal sent from the dispenser, and converts this signal into a digital signal. The digital signal is recognized by the signal processor. The signal processor adjusts the parameter settings in the EEPROM according to the instructions from the dispenser. When the instructions are read into the EEPROM of the particular hearing aid, a digital bit sequence to acknowledge the adjustment will be sent to the telephone using the wireless link, where it triggers an acoustic message, which is converted into a corresponding analog signal and is superimposed onto the analogue microphone signal. The ordinary telephone signal processing unit will send it over the telephone network to signify to the dispenser that the adjustment was successful, or in case that the adjustment was not successful, that a readjustment should be made, or it may send a message indicating why there was a problem with the adjustment.

As mentioned, the adjustment may be executed either by the telephone or by the hearing aid. Controlling the adjustment from the telephone will have the advantage that the telephone can be adapted to inhibit streaming of sound to the hearing aid, while the programming is going on. Further, the telephone interface circuit can be adapted to detect whether an acknowledge signal has been received within due time, and could indicate this to the dispenser.

Adjusting a hearing aid as described can be used for many different situations, of which a few will be described next.

New hearing aid users will often go through an acclimatization period, when they receive their first hearing aid, where the gain of the hearing aid is gradually increased over time, because it would otherwise be too overwhelming for the user, if the hearing aid was set from the onset to fully compensate for the hearing loss that the user had gotten used to over time. This acclimatization period can be controlled by the dispenser, by way of the user visiting the clinic twice during the first 6 months to get the hearing aid adjusted. Or the acclimatization can be made automatically based on the number of days and hours the hearing aid has been used. According to the invention, the acclimatization adjustment of the gain settings can be carried out during a telephone conversation with the dispenser.

Due to the limited amount of non-volatile memory in hearing aids, the manufacturers have to limit the options of logging information about the operation of the hearing aid. With the use of the present invention, the dispenser can easily reprogram the hearing aid to log data regarding different hearing aid parameters or log all possible parameters in a limited time period. If a hearing aid user calls the dispenser complaining about issues that the dispenser may not recognize the solution to, the dispenser may via DTMF tones change the hearing aid logging mechanism to a more aggressive setting or change the logging to concentrate on a specific acoustical area. A number of hours or days later, the dispenser will call back to the hearing aid user. The dispenser can then read out the log via DTMF tones and together with the user zoom in on the experienced problem, and adjust the hearing aid appropriately, without the user having to come into the clinic.

Some hearing aids have a service alarm, which can be set to play a message to the user after a preset time interval, to remind the user to book an appointment with the dispenser for a service check. According to the present invention, this alarm can be activated, deactivated, reset, etc. over the telephone.

Some high-end binaural hearing aid systems which communicate wirelessly with each other have a partner alarm system. The partner check and alarm may be enabled or disabled by use of the present invention.

The characteristics of the electrical components may drift over time, whereby the optimal tuning can be altered. This is also the case with the hearing aid antenna circuit. In most cases, the wireless link will still work, it just requires more energy, than if it had an optimal tuning. With the present invention, the fine tuning of the antenna circuit may be initiated by the dispenser over the telephone. There may be other kinds of similar analysis made in this way. E.g. a self test analysis, where the hearing aid checks the hearing aid components, could be initiated in this way. For such analysis of the functioning of the hearing aid, it is often desired to be able read out the result of the analysis. It is in general desirable for the hearing aid dispenser to get a message back about the status of the hearing aid, or whether the wireless connection is active. E.g. if the telephone can communicate with the contralateral hearing aid but not with the ipselateral hearing aid, there is a problem with the radio of the ipselateral hearing aid, or the ipselateral hearing aid may simply have been turned off, or out of battery. Such status requests are easily made, using the proposed system.

When hearing aids are set up for the specific user, part of the fitting procedure is to create a nominal model for the feedback path. This is used by an anti feedback system, to prevent the hearing aid from howling due to feedback. If the procedure for creating this model was not performed at all or performed with insufficient accuracy or the ear has grown, or other parameters have changed, that makes the model less accurate, and the user may encounter feedback howling. With the use of the present invention, the dispenser may initiate a test to update the feedback path model. However, if the telephone is held near the ear, the acoustic path will change dramatically, making a model obtained under these conditions unsuited for the purpose. This can be overcome by using the contralateral hearing aid as a relay device when performing this test. When a new feedback model is created for the left hearing aid, the telephone is held up to the right ear, and the right hearing aid is then used to control the test of the left hearing aid. As part of the communication protocol between the hearing aid and the telephone, one bit may be reserved as a check bit to let the dispenser know whether the communication goes through the left or right hearing aid, to ensure that the feedback test is performed at the contra lateral hearing aid.

Many hearing aids use spoken messages to acknowledge to the user when he adjusts the volume or changes program. Even though these messages are adjusted in volume according to the users hearing loss, the user might find the sounds of these messages too soft or too loud. They might even be too loud in some acoustic environments and too soft in other environments. The same applies when using the telecoil in theatres etc. These sounds may be adjusted according to the present invention. Furthermore, the volume control on the hearing aid may be enabled/disabled is this way. This may be useful in case it is a child wearing the hearing aid and the child plays with the volume control of their hearing aid, so that sounds are suddenly too loud or too soft to hear.

In some hearing aid systems, the user may be able to influence the amplification strategy. For instance, the hearing aid may gradually adapt according to the users wishes in specific sound environments. Despite the advantages of such a system, there is a risk that this could derail the optimal fitting strategy. It may therefore be beneficial to be able to go back to the original fitting strategy, by calling the dispenser to get the hearing aid reset.

Programmable hearing aids today may have a huge amount of settings and programs available, which the dispenser can offer the hearing aid user. The difference between a high-end product and a cheaper version may very well be a matter of choosing to enable or disable features, programs, accessories etc. The user may after a while choose to upgrade the hearing aid or may want to hide programs or settings that are not used. Furthermore, the dispenser has the option of adding sound features like compression, expansion, noise reduction, frequency transposition or -compression. Such features might improve the sound quality, but the user might not be able to adapt to the changed sound picture. The dispenser is now able to try out these settings and programs, without the user having to revisit the clinic to add a program or modify an inappropriate or unpleasant setting, by making a phone call to the hearing aid clinic. Even adding accessories for the hearing aid, like remote controls, or enabling new hardware devices within the hearing aid, may be possible without the user having to go to the clinic. Hardware devices within the hearing aid may be enabled via DTMF, and accessories may be mailed to the user. Pairing the accessory with the hearing aid is then performed over the telephone.

What is claimed is:

1. A telephone having an electronic processing circuit providing a processed audio signal supplied to a loudspeaker via an electrical signal line, and being modified by mounting an interface circuit to the telephone so the modified telephone becomes adapted to transfer a speaker signal from the telephone to a hearing aid via a dedicated wireless link; wherein interface circuit includes all of the following:
   an input connected to the electrical signal line for receiving the speaker signal,
   an analog-to-digital converter for converting the speaker signal to a digital signal,
   a processor for preparing the digital signal for transmission, and
   a transceiver configured to establish the dedicated wireless link between the telephone and the hearing aid, whereby a signal representing sound picked up from the electronic processing circuit is sent to the hearing aid for processing in accordance with a user's hearing impairment.

2. The telephone according to claim 1, wherein the transceiver employs a hearing aid compatible radio protocol for transmission.

3. The telephone according to claim 1, having a microphone, wherein the interface circuit is connected to the microphone, and wherein the interface circuit is powered by the microphone when the microphone is biased during a call.

4. The telephone according to claim 1, wherein the interface circuit transmits a signal to be received by two hearing aids in a binaural set of hearing aids.

5. A method of modifying a telephone so it becomes adapted to transfer a speaker signal from the telephone to a hearing aid via a dedicated wireless link, wherein the telephone includes an electronic processing circuit providing a processed analog audio signal supplied to a loudspeaker via an electrical signal line, the method comprising the steps of:
   mounting an interface circuit integral to the telephone, and
   connecting the interface circuit to the electrical signal line for picking up the analog audio signal during a call,
   wherein interface circuit includes all of the following:
   an input connected to the electrical signal line for receiving the speaker signal,
   an analog-to-digital converter for converting the speaker signal to a digital signal,
   a processor for preparing the digital signal for transmission, and
   a transceiver configured to establish the dedicated wireless link between the telephone and the hearing aid, whereby a signal representing sound picked up from the electronic processing circuit is transmitted to the hearing aid for processing in accordance with a user's hearing impairment.

6. The method according to claim 5, comprising the step of powering the interface circuit by a microphone of the telephone when the microphone is biased during a call.

7. The method according to claim 5, wherein the signal transmitted to the hearing aid is received by two hearing aids in a binaural set of hearing aids.

8. The method according to claim 7, wherein the signal transmitted to the hearing aid is transmitted to a first one of the two hearing aids, and relayed from the first one of the two hearing aids to a second one of the two hearing aids.

9. The method according to claim 7 wherein the set of binaural hearing aids have respective microphones for picking up the sound of the environment, the method comprising disabling the hearing aid microphones when receiving the digital signal via the dedicated wireless link from the telephone.

10. The method according to claim 7, wherein the set of binaural hearing aids have respective microphones for picking up a sound of the environment, the method comprising decreasing a gain applied to the sound of the environment when receiving the digital signal via the dedicated wireless link from the telephone.

11. A hearing system for handling telephone calls and comprising a set of binaural hearing aids each including a radio for inter-ear communication and a telephone,
   the telephone having an electronic processing circuit providing a processed audio signal supplied to a loudspeaker via an electrical signal line, and being modified by mounting an interface circuit to the telephone so the modified telephone becomes adapted to transfer a speaker signal from the telephone via a dedicated wireless link to the inter-ear radio of the hearing aids;
   wherein interface circuit includes all of the following:
   an input connected to the electrical signal line for receiving the speaker signal,
   an analog-to-digital converter for converting the speaker signal to a digital signal,
   a processor for preparing the digital signal for transmission, and
   a radio configured to establish the dedicated wireless link between the telephone and the hearing aid, whereby a signal representing sound picked up from the electronic processing circuit is transmitted to the hearing aid for processing in accordance with a user's hearing impairment.

12. The hearing system according to claim 11, having a microphone, wherein the interface circuit is connected to the microphone of the telephone, and wherein the interface circuit is powered by the microphone when the microphone is biased during a call.

13. The hearing system according to claim 11, wherein the signal transmitted by the interface circuit is received by two hearing aids in a binaural set of hearing aids.

14. The hearing system according to claim 13, wherein the interface circuit transmits the signal to a first one of the two hearing aids, and the first one of the two hearing aids relays the signal to a second one of the two hearing aids.

15. The hearing system according to claim 13, wherein the set of binaural hearing aids have respective microphones for picking up the sound of the environment, and wherein the hearing aids are adapted to disable the hearing aid microphones when receiving the digital signal via the dedicated wireless link from the telephone.

16. The hearing system according to claim 13, wherein the set of binaural hearing aids have respective microphones for picking up the sound of the environment, and wherein the hearing aids are adapted to decrease the gain applied to the sound of the environment when receiving the digital signal via the dedicated wireless link from the telephone.

17. The telephone according to claim 1, wherein all of said elements of said interface circuit are carried on a common module connectable to said telephone.

18. The method according to claim 5, wherein all of said elements of said interface circuit are carried on a common module connectable to said telephone.

19. The hearing system according to claim 11, wherein all of said elements of said interface circuit are carried on a common module connectable to said telephone.

* * * * *